United States Patent [19]
Girard et al.

[11] 3,878,443
[45] Apr. 15, 1975

[54] CAPACITOR WITH GLASS BONDED CERAMIC DIELECTRIC

[75] Inventors: Roland T. Girard, Scotia; George A. Rice, Schenectady, both of N.Y.

[73] Assignee: General Electric Company, Schenectady, N.Y.

[22] Filed: July 27, 1973

[21] Appl. No.: 383,280

[52] U.S. Cl. ............... 317/258; 252/63.2; 252/514
[51] Int. Cl. ........................... H01g 1/01; H01g 3/06
[58] Field of Search ............ 252/63.2, 514; 317/258

[56] References Cited
UNITED STATES PATENTS

| | | |
|---|---|---|
| 3,293,077 | 12/1966 | Kaiser ............................ 317/258 X |
| 3,374,110 | 3/1968 | Miller ................................. 252/514 |
| 3,649,353 | 3/1972 | Ulrich ........................... 317/258 UX |

*Primary Examiner*—E. A. Goldberg
*Attorney, Agent, or Firm*—Donald M. Winegar; Joseph J. Cohen; Jerome C. Squillaro

[57] ABSTRACT

An improved high dielectric constant ink useful in making thick film capacitors is disclosed in which a dielectric material is combined with a glass bonding agent having an electropositive element common with the dielectric material. In a preferred embodiment, the improved dielectric material comprises a barium titanate dielectric combined with barium zinc glass.

18 Claims, 1 Drawing Figure

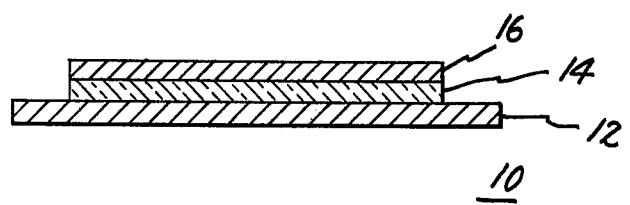

CAPACITOR WITH GLASS BONDED CERAMIC DIELECTRIC

This invention relates to thick film capacitors and, in particular, to a high dielectric constant material for making such capacitors.

In the semiconductor art, the use of discrete (separate) devices mounted on a printed circuit board is increasingly giving way to the fabrication of complete circuits in a single package containing a ceramic substrate. Devices, such as resistors and capacitors, as well as their electric interconnections, are formed on the substrate by screen printing.

Screen printing, as is known in the art, entails forcing a liquid mixture through a patterned screen to print the components on the substrate. The substrate is then dried and fired to harden the materials in place. The screen may comprise silk, stainless steel, or other appropriate material depending upon the device being printed. The liquid mixture, herein referred to as an "ink," comprises finely divided particles, a binder, and a liquid vehicle.

Screen printing, however, poses special problems for forming capacitors. The dielectric material for the capacitors must be in the form of finely ground particles suspended in a liquid vehicle. The electric properties of the dielectric material are not the same for the bulk and the finely ground, printed and fired conditions. Thus, there is a problem producing high dielectric constants in screen printed capacitors due to the fact that the deposited material must be finely ground particles which cannot be brought back to their original, high density.

Other difficulties arise from the binders needed to hold the particles together during firing. The material used as the binder can contribute to poor dielectric constant and high dissipation factor by reacting with the dielectric during firing. Further, the firing temperatures of the electrode material are generally lower than ideal for binders presently used. Noble metal electrodes, which can withstand higher firing temperatures, are generally too expensive for most applications.

Yet another difficulty that must be overcome is the aging characteristics of the dielectric, i.e., change in dielectric constant at elevated temperatures or at high applied voltages. For example, presently used dielectric materials change in dielectric constant by approximately 22% in the temperature range of from 100° to 150°C, and by approximately 33% over an applied voltage range of 0 to 167 volts per mil thickness.

It has been difficult to overcome these difficulties simultaneously with presently available dielectric inks, particularly in finding a suitable binder.

In view of the foregoing, it is therefore an object of the present invention to provide an improved dielectric ink for thick film capacitors.

Another object of the present invention is to provide an improved binder for dielectric inks that does not deteriorate the dielectric constant of the resulting material.

A further object of the present invention is to provide an improved dielectric that is more resistant to aging effects.

The foregoing objects are achieved in the present invention wherein an improved dielectric ink comprises a powdered, high dielectric constant material, a binder containing an electro-positive element common to the dielectric material, and a liquid vehicle. In accordance with one embodiment of our invention, the improved dielectric ink comprises barium titanate, a glass binder having an electro-positive element common to the dielectric material, such as barium, and a liquid vehicle. The barium titanate may be chemically pure or modified, i.e., contain small amounts of metal oxide additives such as lanthanum oxide, cerium compounds, stannates, zirconates and bismuth compounds.

DESCRIPTION OF THE DRAWING

The Drawing is an elevation view, in cross-section of a capacitor made in accordance with the teachings of this invention.

A more complete understanding of the present invention can be obtained by considering the following detailed description including several specific examples of the present invention.

The dielectric constant of screen printed dielectric for thick film capacitors is affected by a number of parameters. As previously noted, the very high dielectric constant of the dielectric material in the bulk state is lost when the material is ground into fine particles for the printing operation. The firing of the dielectric after printing can only cause the dielectric to approach its original density and hence its original dielectric constant.

The firing of the printed dielectric may further reduce the dielectric constant. As previously noted, the dielectric cannot be fired at as high a temperature as preferred due to the presence of other components such as the electrical conductors. Further, the firing of the dielectric material in contact with the electrical conductors may produce a high temperature, chemical reaction between the electrode and the dielectric.

While the exact high temperature mechanism or what produces the aging characteristic is not fully understood, it has been found that an alkali-free glass binder containing an electro-positive element common to the dielectric material produces a dielectric having high dielectric constant and better resistance to aging effects. It is believed that the presence of the common electro-positive element in the glass binder prevents or acts as a substitute for reactions with that element in the dielectric material.

With reference to the FIGURE, and as is known, thick film capacitors 10 are formed by printing and firing in successive layers, the first electrode 12, the dielectric 14, the second electrode 16. As previously noted, one difficulty is that the dielectric 14 cannot generally be fired at as high a temperature as desired due to the presence of the first electrode 12. In the following table, this is indicated by the variation in dielectric constant (K) with the firing of the second electrode, i.e., further firing improves the dielectric constant. The primary purpose of the first table is to provide examples of different percentages by weight of glass binder relative to the dielectric material. In the examples listed in the first table, the dielectric material comprises chemically pure (CP) barium titanate.

Table I

| Ba glass | $BaTiO_3$ (CP) Second electrode firing | | K |
| --- | --- | --- | --- |
| | Temp (°C) | Time (Min) | |
| 3% | 850 | 10 | 580 |
| 5% | 850 | 10 | 570 |
| 7% | 850 | 10 | 530 |

Table I-Continued

| | BaTiO₄ (CP) Second electrode firing | | |
|---|---|---|---|
| Ba glass | Temp (°C) | Time (Min) | K |
| 3% | 1050 | 12 | 790 |
| 5% | 1050 | 12 | 930 |
| 7% | 1050 | 12 | 760 |

The glass binder utilized in Table I is fired at 1,050°C for 12 minutes for all samples and comprises a barium zinc glass having the following composition by oxide percent:

| | Range (%) | Preferred (%) |
|---|---|---|
| BaO | 38-46 | 42 |
| ZnO | 7-11 | 9 |
| SiO₂ | 35-45 | 40 |
| B₂O₃ | 6-8 | 6 |
| Al₂O₃ | 2-5 | 3 |

Preparation of the capacitor ink is performed as follows: chemically pure barium titanate is milled in acetone to break down agglomerated particles. After drying, the particles are mixed with a solution of ethyl cellulose in pine oil, by means of a mortar and pestle, in the following proportions:

| | | |
|---|---|---|
| Barium Titanate (CP) | 24 gms. | |
| Ethyl Cellulose Solution | 10 gms. | (60 cc. pine oil (8 gms. ethyl cellulose |

The barium zinc glass used as the binder is prepared by weighing out the proportions of oxides and wet mixing them in acetone. After drying, the mixture is smelted in a platinum crucible to 1,390°C using a platinum stirrer to insure uniformity. The melt is then poured on a steel chill plate after which it is pulverized and ground to 1 to 2 micron particle size and mixed with the barium titanate and ethyl cellulose solution.

The capacitor ink thus formed, when printed through a 165 mesh stainless steel screen, produces a pin-hole free dielectric of approximately uniform thickness. The dielectric exhibits high dielectric constant, as shown in the above table, and good aging characteristics. For example, the dielectric constant varies by approximately 19% over a temperature range of 100°C to 150°C and varies by approximately 22% over an applied voltage range of 0-167 volts per mil.

For Tables II and III, the dielectric material comprises modified barium titanate, that is, a mixture of barium titanate and small amounts of metal oxide additives. Specifically, the dielectric material comprises 84% barium titanate and 16% barium stannate.

As is known, chemically pure barium titanate exhibits a variation in dielectric constant with temperature. Specifically, in curve of the variation of dielectric constant with temperature, a pronounced peak occurs at approximately 125°C. The dielectric constant varies from about 1,500 at 25°C to from 6,000 to 10,000 at 125°C. This wide variation in dielectric constant must be allowed for in the circuitry utilizing the chemically pure barium titanate as a dielectric. Modified barium titanate, on the other hand, has a dielectric constant that is relatively uniform, at approximately 2,000, over a wide temperature range, e.g. 50°-150°C.

Table II comprises examples of the present invention utilizing modified barium titanate as the dielectric material with 3 and 7 percent by weight barium zinc glass binder. Table II further shows that the dielectric constant is electrode dependent, i.e., the choice of electrode material may increase or decrease the dielectric constant, even with the same dielectric material. Further, even with the preferred palladium-silver electrodes, some variation in dielectric constant is obtained depending upon the electrode paste or ink utilized. In Table II, the metal type numbers refer to commercially available preparations; specifically, as sold by E.I. DuPont de Nemeurs and Co.

Table II

| Modified BaTiO₄ (84% BaTiO₄ + 16% BaSnO₃) | | |
|---|---|---|
| Ba Glass | Metal Type | K |
| 3% | 8151 | 1002 |
| 7% | 8151 | 873 |
| 3% | 8228 | 723 |
| 7% | 8228 | 557 |

In the following table, the dielectric again comprises modified barium titanate but the glass binder comprises a glass containing both barium and titanate, that is the glass contains two electro-positive elements in common with the dielectric material. A similar variation in dielectric constant with electrode material may be noted.

Table III

| BaTi glass* | Metal Type | K |
|---|---|---|
| 3% | 8151 | 845 |
| 7% | 8151 | 696 |
| 3% | 8228 | 746 |
| 7% | 8228 | 696 |
| BaO | | 42.05 |
| ZnO | | 9.00 |
| SiO₂ | | 35.59 |
| B₂O₃ | | 5.96 |
| Al₂O₃ | | 2.67 |
| TiO₂ | | 4.73 |

*Ba-Ti glass composition —oxide percent:

While only the preferred composition of the barium-titanium glass is given, it is understood that the variation in composition is approximately the same as for the barium zinc glass listed previously.

There is thus provided by the present invention an improved binder for thick film printed capacitor dielectrics that does not contribute to poor dielectric constant or react as readily with the dielectric material during firing. Further, the binder provides a resulting dielectric having improved aging characteristics, enabling a capacitor formed therewith to withstand higher voltages than obtainable in the prior art.

Having thus described the invention, it will be apparent to those skilled in the art that various modifications may be made within the spirit and scope of the present invention.

What we claim as new and desire to secure by Letters Patent of the United States is:

1. A capacitor comprising:
   a first electrode comprising an electrically conductive metal;
   a layer of dielectric material comprising barium titanate and an alkali-free glass binder having at least the electropositive element barium therein which is a common electropositive element to the element present in the dielectric material disposed on, and in an electrically conductive relationship with, the first electrode;

the alkali-free glass binder comprises the following formulation:

| Ingredient | % By weight |
|---|---|
| BaO | 38 to 46 |
| ZnO | 7 to 11 |
| SiO$_2$ | 35 to 45 |
| B$_2$O$_3$ | 6 to 8 |
| Al$_2$O$_3$ | 2 to 5 | and a second electrode comprising an electrically conductive metal disposed on, and in an electrically conductive relationship with, the layer of dielectric material.

2. A capacitor as set forth in claim 1 wherein said glass binder comprises two electropositive elements in common with elements in the dielectric material.

3. A capacitor as set forth in claim 2 wherein said electrodes comprise palladium silver.

4. A capacitor as set forth in claim 1 wherein the alkali-free glass binder has the following formulation:

| Ingredient | % by weight |
|---|---|
| BaO | 42 |
| ZnO | 9 |
| SiO$_2$ | 40 |
| B$_2$O$_3$ | 6 |
| Al$_2$O$_3$ | 3 |

5. A capacitor as set forth in claim 1 wherein the glass binder includes titanate as a second electropositive element.

6. A capacitor as set forth in claim 5 wherein the dielectric material comprises 84% by weight barium titanate and 16% by weight barium stannate.

7. A capacitor as set forth in claim 2 wherein the alkali-free glass binder has the following formulation:

| Ingredient | % by weight |
|---|---|
| BaO | 42.05 |
| ZnO | 9.00 |
| SiO$_2$ | 35.59 |
| B$_2$O$_3$ | 5.96 |
| Al$_2$O$_3$ | 2.67 |
| TiO$_2$ | 4.73 |

8. A capacitor as set forth in claim 7 wherein the dielectric material comprises 84% by weight barium titanate and 16% by weight barium stannate.

9. A capacitor as set forth in claim 4 wherein the dielectric material comprises 84% by weight barium titanate and 16% by weight barium stannate.

10. A capacitor as set forth in claim 4 wherein said electrodes comprise palladium silver.

11. A capacitor as set forth in claim 5 wherein said electrodes comprise palladium silver.

12. A capacitor as set forth in claim 8 wherein said electrodes comprise palladium silver.

13. A capacaitor as set forth in claim 1 wherein the barium titanate is chemically pure.

14. A capacitor as set forth in claim 1 wherein the barium titanate is modified with small amounts of at least one metal oxide additive selected from the group consisting of lanthium oxide, cerium compounds, stannates, zirconates, and bismuth compounds.

15. A capacitor as set forth in claim 4 wherein the barium titanate is chemically pure.

16. A capacitor as set forth in claim 4 wherein the barium titanate is modified with small amounts of at least one metal oxide additive selected from the group consisting of lanthium oxide, cerium compounds, stannates, zirconates and bismuth compounds.

17. A capacitor as set forth in claim 7 wherein the barium titanate is chemically pure.

18. A capacitor as set forth in claim 7 wherein the barium titanate is modified with small amounts of at least one metal oxide additive selected from the group consisting of lanthium oxide, cerium compounds, stannates, zirconates and bismuth compounds.

* * * * *